United States Patent [19]
Isenberg

[11] Patent Number: 5,922,178
[45] Date of Patent: Jul. 13, 1999

[54] HIGH TEMPERATURE GAS SEPARATION APPARATUS

[76] Inventor: Arnold O. Isenberg, 327 Woodside Rd., Pittsburgh, Pa. 15221

[21] Appl. No.: 08/882,578

[22] Filed: Jun. 25, 1997

[51] Int. Cl.⁶ ........................................... C25B 9/00
[52] U.S. Cl. .................. 204/265; 204/266; 204/241; 204/258; 204/260; 55/315.2; 422/198
[58] Field of Search ..................................... 204/241, 258, 204/260, 262, 265, 266, 282; 95/288, 67, 73; 96/52, 74; 55/315.1, 315.2; 422/198

[56] References Cited

U.S. PATENT DOCUMENTS

| | | | |
|---|---|---|---|
| 3,761,062 | 9/1973 | King | 261/1 |
| 3,921,713 | 11/1975 | Schnitzer et al. | 165/167 |
| 4,093,429 | 6/1978 | Siegler et al. | 55/58 |
| 5,118,395 | 6/1992 | Chen et al. | 204/59 R |
| 5,332,483 | 7/1994 | Gordon | 204/265 |
| 5,451,386 | 9/1995 | Collins et al. | 423/237 |

OTHER PUBLICATIONS

Folger, Scott H., Elements of Chemical Reaction Engineering, Prentice Hall, p. 85, 1992.

*Primary Examiner*—Kathryn L. Gorgos
*Assistant Examiner*—Wesley A. Nicolas
*Attorney, Agent, or Firm*—Klaus J. Bach

[57] ABSTRACT

A high temperature gas separation apparatus, integrated with, and enclosed by, a heat exchanger-thermal insulation, providing for counter-flow heat exchange between a cold inlet flow of a gas mixture containing one gas component and the hot return gas being depleted of the one gas component. Two adjacent heat exchanger flow channels surround a heated central gas separation unit in multiple spiral windings and provide the thermal insulation for the gas separation apparatus which operates at ambient or elevated pressure, resulting in significant savings in materials and energy cost, and greatly reduced weight for gas separation systems, such as electrochemical oxygen generators, and for hydrogen and helium separators.

28 Claims, 4 Drawing Sheets

HIGH TEMPERATURE GAS SEPARATION APPARATUS

BACKGROUND OF THE INVENTION

1. Field of the Invention

The present invention, in one application, relates to heat exchange and thermal insulation of apparatus for the electrochemical separation of oxygen from air or other oxygen rich gases for industrial, medical, and life support use, whereby heated, oxygen ion conducting ceramic devices are the means by which oxygen is separated from the oxygen containing gas mixtures. One type of electrochemical oxygen separator operates on the principle of high temperature electrochemical cells. The cells consist of separate electrode compartments and the electrodes are separated by, and in intimate contact with, predominantly oxygen ion conducting solid state electrolytes. Another type of electrochemical oxygen separator is based on oxygen ion conducting electrolytes which are also electronically conducting. This type of separator separates oxygen by means of establishing an oxygen pressure gradient across a mixed conducting (oxygen-ionic/electronic) oxide barrier, for instance, in the form of a tubular wall, to cause oxygen permeation through it and to emerge as pure oxygen gas on the other side of the barrier. Since both methods of oxygen separation are based on the oxygen ion conduction of pure ionic or mixed, oxygen-ionic/electronic, conductors, such separation devices will be called active electrochemical oxygen separation units.

An active electrochemical oxygen separation unit must be heated to temperature levels ranging between 500 and 900° C. in order to increase the conductance of the oxygen ion conductors. As a consequence, oxygen containing feed gases must be heated to these temperature levels. The sensible heat of the oxygen depleted gases, exiting the active separation unit, must be recovered through heat exchange with the colder oxygen rich feed gases, in order to make electrochemical oxygen separators efficient in energy consumption, as well as acceptable, especially for uses such as patient home care and aeronautical life support systems, where excessive heating of closed environments must be avoided. For industrial applications energy efficiency is the most important reason for heat recovery.

The present invention relates, in another application, to the separation and/or purification of hydrogen from a gas mixture containing hydrogen. Microporous ceramic membranes are presently being developed which are permeable to hydrogen at elevated temperatures and under differential pressure conditions. Since hydrogen is a highly desirable energy commodity, such separation devices are of interest to many chemical and petrochemical process applications. In the following such hydrogen separation devices will be called hydrogen separators. The hydrogen separation process also requires efficient heat exchange between feed gases and hydrogen depleted exit gas in order to be efficient in energy consumption.

The application of this invention can be useful also in other gas separation processes, such as helium separation from helium containing gas mixtures by selective diffusion through membranes, which is similar to the hydrogen separation process, as well as in high temperature gas separation processes where heat exchange as well as thermal insulation is required.

2. Description of the Prior Art

Electrochemical devices that make rise of oxygen ion conductors for separation of oxygen from gas streams have been reported in the literature. U.S. Pat. No. Re. 28,792 (Ruka et al.) teaches the use of oxygen ion conducting electrolytes, such as yttria-stabilized zirconia in tubular form. When such a tube is coated on the inside and outside with platinuin electrodes, then heated in air while the electrodes are connected to a D.C. power supply, an ionic current of oxygen ions will now through the—otherwise gas impervious—tube wall from the cathode (negative terminal) to the anode (positive terminal). When the anode is made the inside electrode of the tube, pure oxygen will flow from the tube inside.

Oxygen ion conducting electrochemical devices have been constructed with solid electrolytes such as doped bismuth oxide and doped cerium oxide, as reported in the literature by E. N. Naumovich et al., Solid State Ionics 93, 1997, 95–103, and H. Inaba, H. Tagawa, Solid State Ionics 83, 1996, 1–16, respectively. Such oxide mixtures are investigated because they have a higher oxygen ion conductivity than stabilized zirconia U.S. Pat. No. 5,045,169 (Feduska et al.) teaches an electrochemical oxygen separator which makes use of a thin layer of solid electrolyte made of stabilized zirconia. The described oxygen separator consists of a multiple cell stack where cells are electrically connected in series. The cell stack is supported on a porous stabilized zirconia tube, which, in addition, serves as oxygen delivery conduit. The same electrochemical oxygen separator cell stack structure is applied in U.S. Pat. No. 5,186,793 (G. A. Michaels), it teaches a high temperature electrochemical oxygen generator whereby some recuperative heating of feed air is accomplished, however, the sensible heat of the partially oxygen depleted air is dispersed through mixing with large amounts of ambient air.

An example of heat exchange with respect to a high temperature electrochemical oxygen separator is taught by U.S. Pat. No. 5,332,483 (A. Z. Gordon), wherein air is preheated in a heat exchanger with spent air from a bipolar electrolysis module, the heat exchanger and electrolysis module being separate units connected via gas ducts.

An oxygen separator which is based on mixed conducting electrolyte membranes through the application of differential oxygen pressures is disclosed in EPRI Final Report GS/ER-7097, Res. Proj. 1676-11, 8002–16, (Feduska et al.), which describes the mode of operation and composition of a mixed conducting oxygen ion conductor on the basis of zirconia. Another publication in Solid State Ionics 72 (1994) pp 185–194 (H. J. M. Bouwmeester et a).) describes the use of perovskite type mixed conducting oxide materials for electrochemical oxygen separator membranes. A large number of mixed oxides in the family of perovskites are potential candidates for device applications, such as $SrFe_{1-x}Co_xO_y$, $LaNi_{1-x}Co_xO_3$, and many others.

At this point in time, there are no known electrochemical oxygen separators for the intended applications such as home patient care (which need to deliver 3 to 5 liters of oxygen per minute) commercially available. Specific information, therefore, on prior art with respect to efficient heat exchange and thermal insulation for high temperature electrochemical oxygen separators is scarce.

General information on heat exchange of gas processes is plentiful and a large number of heat exchanger construction principles and materials of construction are available. The following literature teaches most aspects of heat transfer: Compact Heat Exchangers, W. M. Kays, A. L. London, The Natl. Press, Palo Alto, Calif. 1955; Heat Exchangers: Design and Theory Source Book, N. H. Afgan, E. V. Schlunder, Edts., McGraw-Hill Book Co., 1974; Handbook of Heat Transfer, W. M. Rohsenow, J. P. Hartnett Process Heat Transfer, D. Q. Kern, McGraw-Hill Book Co. Inc., 1950; Principles of Heat Transfer, 3rd Edition, F. Kreith, Harper & Row, Publishers, 1973.

A heat exchanger principle, relevant to this invention has been published in Ullman, 1, p. 226, Urban & Schwarzenberg, Publishers, 1951, it describes a heat exchanger exhibiting two separate and sealed spiral flow channels as well as two annular as well as two peripheral gas ports.

In general, most heat exchanger concepts, whether based on the tube and shell or plate type, are built with absolutely leak free flow channels in mind for the separate gas streams which are undergoing heat exchange. Furthermore, heat exchanger technology, traditionally, strives for structural integrity and mechanical stability because the heat transfer devices are often used as pressure vessels or as multiple vessels combined in one pressure envelope. Heat exchangers, therefore, are constructed specifically for various applications, and electrochemical oxygen separators are a typical example of such a case for which a suitable heat exchange concept is needed.

Conventional as well as compact advanced heat exchangers, such as tube and shell or plate type, are much to heavy for portable electrochemical oxygen separators. The maximum practical temperature level for oxygen separators (900° C.) presents another materials limitation that severely limits the availability of useful heat exchanger technology for high temperature oxygen separators especially when pressurized operation of oxygen separators is considered. The strength of heat exchanger vessel alloys is severely reduced at elevated temperatures and pressure operation would, at best, be possible only through increased vessel wall thickness.

Similar problems exist in applying advanced insulation technology to high temperature oxygen separators. There is a number of efficient fibrous ceramic insulation materials commercially available, such as FIBER, SAFFIL AND SAFFIL-derived products which meet temperature stability and insulation criteria, however, all these products are voluminous and have a weight to volume ratio that is too high for portable oxygen generators.

As a result of these considerations one must come to the conclusion that state-of-the-art heat exchanger and insulation technology cannot be applied to portable electrochemical oxygen separators.

In another application of the invention, the separation of hydrogen from mixtures with other gases has been investigated for many years and commercial processes have been developed. The best developed process is that of selective diffusion of hydrogen through palladium silver alloy membranes at 300 to 400° C. U.S. Pat. Nos. 2,911,057 (Engelhard In.); 2,961,062 (Atl. Ref.Co.) teach diffusion separation of hydrogen in palladium/silver diffusion cells. Small laboratory size units of the palladium type are electrically heated without heat recovery, larger units are recuperatively heated. Palladium based hydrogen separators are expensive and are easily irreversibly poisoned by gas impurities such as sulfur compounds. These are the major reasons for the development of molecular sieve based microporous separators which are inexpensive. State-of-the-art palladium membrane technology does not offer advanced low cost and highly efficient heat exchanger and insulation technology which would be helpful in bringing modern highly efficient hydrogen gas separators to a successful commercial application.

Similar considerations are valid for the separation of helium by diffusion from industrial as well as geological gas streams such as natural gas. A French Patent No. 698,822, 1930, teaches the purification of helium by diffusion through quartz at high temperatures. State-of-the-art helium separation, however, is conducted by energy intensive cryogenic methods. Helium separators using micropoous molecular sieve type membranes, which operate at elevated temperatures and differential pressures, offer significant savings in energy consumption.

Ceramic membranes for high temperature hydrogen and helium separation are the subject of investigation in a publication of the Proc. of the 10th Annual Conf. on Fossil Energy Materials, May 1996, Knoxville, Tenn., p. 107 (D. E. Fain, G. E. Roettger).

SUMMARY OF THE INVENTION

It is the object of the present invention to provide a high temperature gas separation apparatus which is compact, relatively light-weight and energy-efficient. This is achieved by the invention of a gas separation apparatus which intimately and structurally integrates a heat exchanger, thermal insulation, and heater, together with an active gas separation unit. The arrangement according to this invention is attractive for oxygen separation from air, as well as for hydrogen separators and helium separators.

In the case of oxygen separation one can use electrochemical cells with electrodes or mixed conducting (ionic/electronic) oxide layers as the essential members of the active gas separation unit. For hydrogen separation, the active gas separation unit can bc based on the function of a palladium alloy diffusion membrane, which allows the selective diffusion of hydrogen through the membrane. The palladium alloy membrane can be substituted by a molecular sieve type microporous ceramic layer which is selectively permeable for the small hydrogen gas molecule, so that the active gas separation unit for hydrogen is based on the separation characteristics of molecular sieve membranes. The same or similar microporous ceramic molecular sieve membrane structure can be used as the basis on which an active )as separation unit for helium functions.

It will become obvious in the following description of a high temperature electrochemical oxygen separator, which is used here as an example only, that close parallels exist between the mentioned gas separation processes with respect to gas flow dynamics, heating, requirements for heat exchange, and thermal insulation, as well as for process conditions under increased pressure.

A heat exchanger surrounds and encloses, a central heater structure, and active electrochemical oxygen separation unit in multiple wound and spaced layers of thin elongated metal sheets in order to form two separate spiral type flat rectangular channels on top of each other for intimate heat exchange between the gases in the adjacent channels. The metal sheets are made from oxidation resistant alloys which are applied as single continuous sheets or, in order to reduce cost, consist of interconnected, welded, metal sheet sections. The innermost part of the spiral heat exchanger assembly forms a cylindrical cavity in which the heated active oxygen separation unit is positioned. The colder outwardly positioned metal sheet sections can be made of stainless steel which is bonded (spot welded or similar) to the oxidation resistant inner section before being wound to a spiral structure. Also, the entire metal sheet can consist of the oxidation resistant alloy if the alloy cost is acceptable. Two separate such metal sheets which, preferably, are one to ten thousands of an inch in thickness, are spaced from each other by small metallic and/or ceramic spacers which are spot welded or bonded to the surfaces of the metal sheets; also embossed profiles on the metal sheets can serve as spacers. A spiral heat exchanger structure, consisting of two separate gas passages, is obtained by winding the two elongated metal sheets with attached spacers on top of each other. The spiral heat exchanger structure represents also the thermal insulation for the oxygen separator since it consists of multiple separate air gaps which reduce convective heat transfer. The so formed heat exchanger-insulation enclosure allows cold air to flow through one spiral gas passage inward toward the heated active oxygen separation unit in the axial center cavity. Oxygen extraction takes place within the central active oxygen separation unit. Hot oxygen-depleted air flows outward and in intimate heat exchange relation with the inward spiralling colder air. The heat exchange is extremely efficient due to the close spacing of the thin metallic heat exchange surfaces. Very little heat loss is experienced due to thermal conduction by way of spacers.

With the arrangement according to the present invention there is no requirement for perfect sealing between the gas flow channels and for a high mechanical strength of the heat exchanger components. Even gas leakage to the environment, as in the case of an oxygen separator, is of little consequence. Also, there is only an insignificant pressure difference between adjacent flow channels and across other gas separation device boundaries, which reduces the need for mechanically strong and thick metallic members.

For operation of the apparatus of this invention under pressurized conditions, such as in the separation of oxygen by diffusion through mixed conducting, oxygen-ionic/electronic, oxide layers, or for the separation of hydrogen or Helium, the apparatus is surrounded by a vessel which also provides for a protective gas atmosphere when required. A major advantage of this arrangement is the fact that only cold vessel materials are under an increased gas pressure since the enclosed high temperature gas separation apparatus has a low outside temperature, only the heated active gas separation units which are disposed in the central cavity of such an apparatus are exposed to pressure differentials, as required by the particular separation process.

BRIEF DESCRIPTIONS OF THE DRAWINGS

The invention will become more readily apparent from the following descriptions of the preferred embodiment thereof shown, by way of example only, in the accompanying drawings, wherein.

DESCRIPTION OF THE PREFERRED EMBODIMENT

Figure 1:
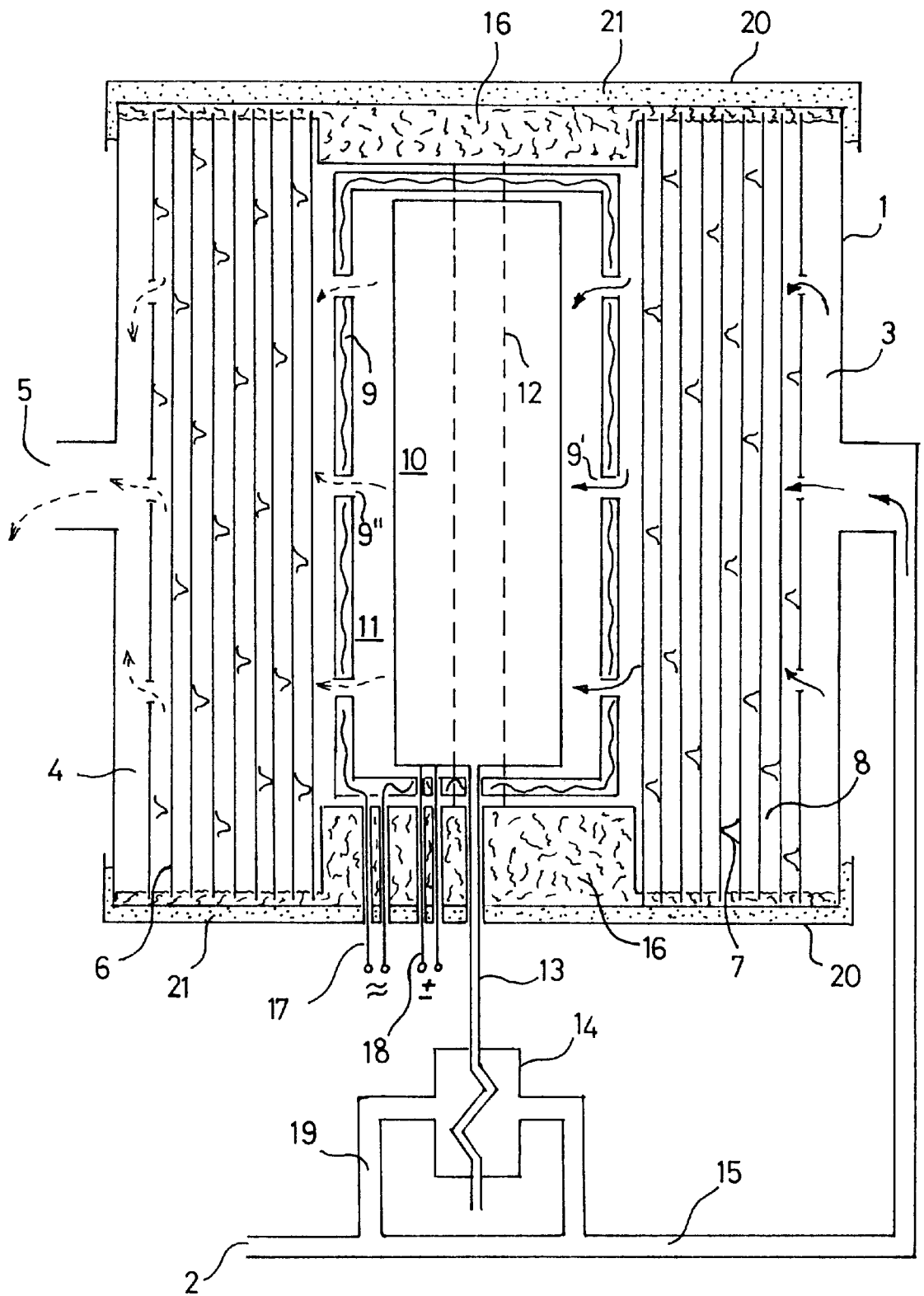
FIG. 1 is a schematic longitudinal cross-sectional view of a high temperature gas separation apparatus with an outer heat exchange-thermal insulation shell and an inner heater and active gas separation unit.

FIG. 1 shows a high temperature (as separation apparatus which is described here, for example only, as a high temperature electrochemical oxygen separator. The electrochemical oxygen separator includes an outer wall 1 which is penetrated at two longitudinal positions for gas access to channels 8 via gas manifolds 3 and 4, defined at opposite sides. Air enters the inlet 2 by the action of a blower or similar (not shown), or by a suction device (not shown) located at outlet 5, or both. The gas manifolds comprise an inlet air manifold 3, and an outlet manifold 4 for oxygen-depleted air. Two thin elongated metal sheets 6 of a thickness between twenty micrometers (~0.001") and two millimeters (~0.080") are separated from each other by spacers 7 in order to create two separate passages for inward and outward gas flow as indicated by solid and dashed arrows, respectively. The spacers are made of small shapes (coils, loops, wire, spheres and the like) of oxidation resistant metal or ceramics which are placed in a few locations and are bonded to one side of said metal sheets 6 in order to allow slippage with respect to the adjacent metal sheets. The spacing between the metal sheets, which can also be achieved by embossing profiles into the sheets, can vary considerably as demanded by the desired degree of heat exchange and thermal insulation. Appropriate spacing dimensions lie between 0.5 mm (~0.02") and 10 mm (~0.4"). The two metal sheets 6 with attached spacers are wound or rolled over each other to create rectangular flat and separate channels 8 for inward flowing air and outward flowing spent air. Two flat separate channels are formed by this winding operation. They have a width and spiral length that is determined by the width and length of the metal sheets 6. The two flat rectangular channels allow counter flow heat exchange between gases, and the multiple wound layers of the flat channels serve as efficient thermal insulation. Many windings of metal sheets 6 with their attached spacers, result in improved heat exchange as well as better thermal insulation. A typical insulation thickness of four inches is composed of 26 to 30 metal sheet layers.

The heat exchanger-thermal insulation layers in the embodiment of FIG. 1 are formed over a heater structure 9 which has inlet and outlet openings, 9' and 9", for gas flow in selected regions. This heater structure forms the circumferential wall of the axial center cavity 11, and it serves also as the supporting structure for the heat exchanger-insulation. The materials of construction for this support structure are high temperature resistant ceramics like alumina, mullite, porcelain, and similar, also oxidation resistant metals can be employed. The heater of the center cavity is also supported and electrically isolated by the ceramic support structure members which form the circumferential wall of the axial center cavity 11. The center cavity is heated by applying electrical power to the terminals 17 of the heater structure.

The axial center cavity 11 is the location for the active electrochemical oxygen separation unit 10 which is powered by direct electrical current applied to its terminals 18. If the oxygen separation apparatus is based on mixed conducting electrolytes in combination with applied oxygen pressure differentials, there is no need for direct current power terminals.

The active oxygen separation unit 11 has an oxygen outlet conduit 13 which is constructed appropriately (not shown here) to accomplish optional heat exchange with incoming fresh air from inlet 2 by means of a bypass 19 to the heat exchanger 14. Fresh air enters the inlet manifold 3 via conduit 15 it flows toward the axial center cavity 11 and passes through appropriate channels in the active electrochemical oxygen separation unit 10 as indicated by arrows. Flow barriers 12 (FIG. 2) are located strategically along and in contact with the active oxygen separation unit 10 in order to accomplish that essentially all the oxygen rich air passes through the electrochemical active oxygen separation unit 10 for efficient oxygen separation.

Spaces between the metal sheets 6 on both ends of the heat exchanger-thermal insulation enclosure are filled with a ceramic cement 16 to form flat end walls. Also the heated axial center cavity 11 is closed off at both ends by the same or a similar cement in order to prevent air escape to the ends as well as for thermal insulation. In order to prevent gas leakage at the ends of the enclosure even more effectively, metal end caps 20 are installed with an additional intermediate layer of ceramic insulation 21 composed of FIBERFAX, SAFFIL, or a similar material.

A circular 12" long and 11" diameter heat exchanger-insulation-heater portion of a high temperature gas separation apparatus, as described in FIG. 1, consists for example of spirally wound 0.001" thick stainless steel sheets with wire coil spacers. The structure includes 26 metal sheet windings of a total insulation thickness of 4". A built-in integrated heater support structure of the same length measures 3" in diameter, and the heated axial center cavity measures 2.5" in diameter. The volume density of this structure was measured to be 0.117 g/cm$^3$ (7.23 lb/cft) inclusive of the heater and heater support, which defines the circumferential wall of the center cavity. In comparison, an 80% porous alumina insulation exhibits a seven times higher volume density. The weight of a conventional heat exchanger in addition to high porosity thermal insulation, therefore, would increase the volume density over that of the heat exchanger-insulation-heater structure in accordance with this invention by a factor of 10 or higher.

Figure 2:
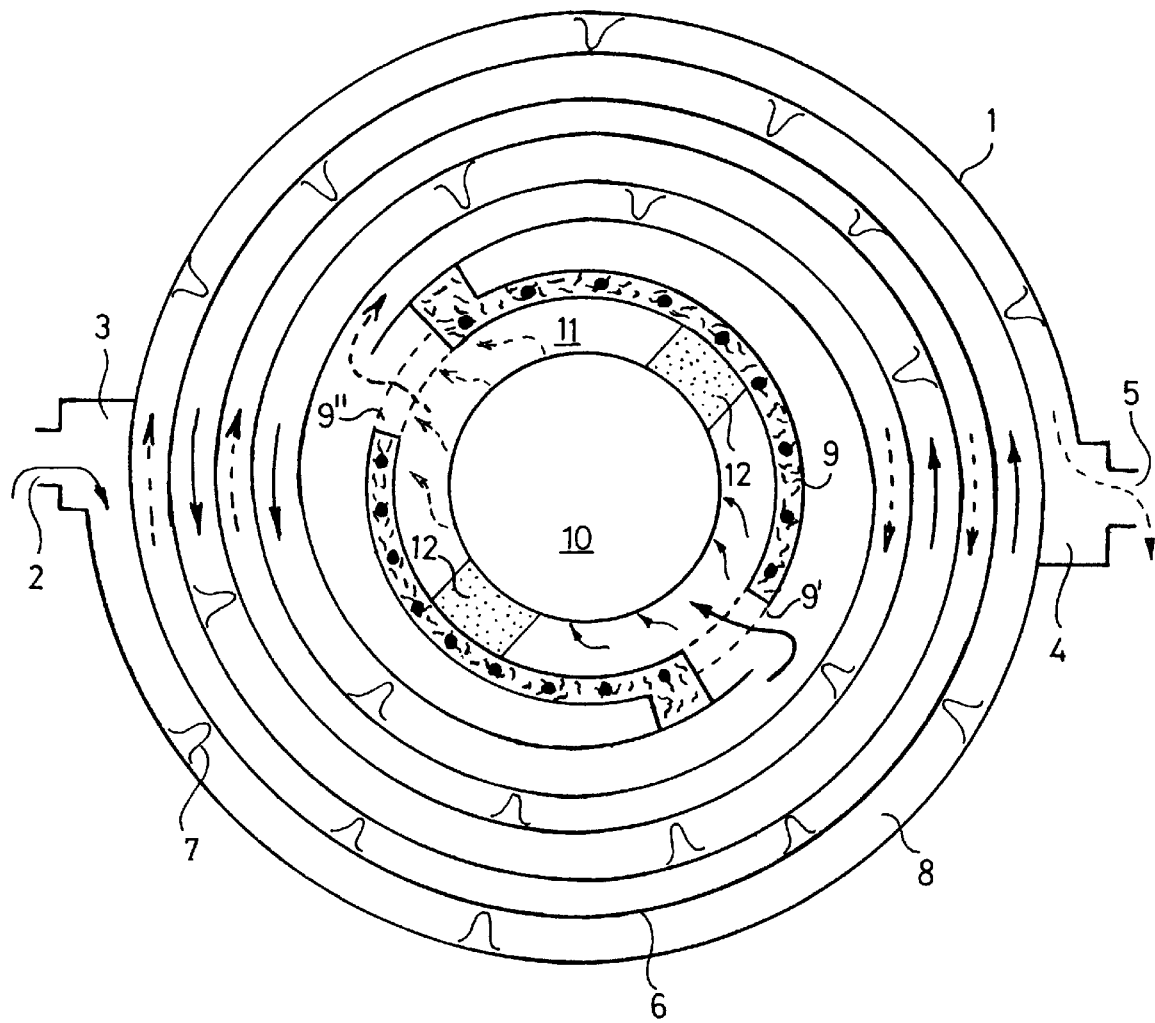
FIG. 2 is a transverse cross-sectional view of the high temperature gas separation apparatus depicting the structures for heat exchange, thermal insulation, and central heater structure for the active gas separation unit.

The schematic transverse cross section of FIG. 2 reveals more clearly the inward spiraling flow path for the oxygen rich air as symbolized by solid arrows and the outward spiraling flow path for the oxygen-depleted air as symbolized by dashed arrows. FIG. 2 also shows the general position and purpose of the flow barriers 12 which force the air flow through the electrochemically active regions (not shown in detail) of the active oxygen separation unit 10.

Both, FIGS. 1 and 2, are only schematic representations of a preferred embodiment. A high temperature gas separation device can have a variety of transverse cross sectional geometries, not limited to shapes such as, square, rectangular, hexagonal, triangular, or round.

In the instance of an oxygen separation apparatus, the electrochemically active separation unit 10 can be based on the use of doped zirconia, doped ceria, and doped bismuth oxide as pure oxygen ion conductors for electrolytes with attached electrodes, structured into electrochemical cells and operating in the DC current-driver mode. The application of a current between the electrodes causes a flow of oxygen ions toward the positive electrode (anode), where oxygen gas evolves; simultaneously, an equivalent amount of oxygen is being removed from the other electrode side of such electrochemical cells.

Suitable doping oxides for stabilized zirconia electrolytes for achieving pure oxygen ion conduction, are the oxides of calcium, scandium, yttrium, and selected elements of the group of lanthanides in the periodic table of elements. Praseodymium oxide introduces electronic conduction to stabilized zirconia, making it an oxygen-ion/electronic mixed conductor. Suitable doping oxides for bismuth oxide electrolytes for oxygen ion conduction are strontium oxide, and yttrium oxide together with zirconium oxide for structural stabilization. Praseodymium oxide doping of bismuth oxide introduces oxygen-ion/electronic mixed conduction. Suitable doping oxides for ceria electrolytes are the oxides of the elements gadolinium and yttrium for oxygen ion conduction. Samarium oxide doping of ceria introduces electronic conduction to achieve mixed conducting ceria.

In the instance of oxygen separation via oxygen pressure differentials across oxygen permeable layers, active separation unit 10 uses layers made of mixed conducting (oxygen-ionic/electronic) oxide mixtures in the perovskite family, or it can be based on electronically doped stabilized zirconia, ceria, and bismuth oxide, in order to cause these pure oxygen ion conductors to become mixed conducting (oxygen-ionic/electronic) conductors.

Perovskite based mixed conducting oxides, as considered in this invention, are of the general chemical formula $ABO_3$, wherein A consists of at least one of the elements calcium, strontium, and of the group of lanthanides in the periodic chart of elements, and the element yttrium, and wherein B consists of at least one of the elements of the group of chromium, manganese, iron, cobalt, nickel, aluminum, gallium, and indium. A major discriminating characteristic of the elements A and B for the formation of the favorable $ABO_3$ compositions, lies in the fact, that their crystal ionic radii are sufficiently different from each other in order to form the mixed conducting perovskite structure, and where A has an ionic radius generally larger than 0.8 Angstrom, and B has an ionic radius generally lower than 0.8 Angstrom.

Figure 3:
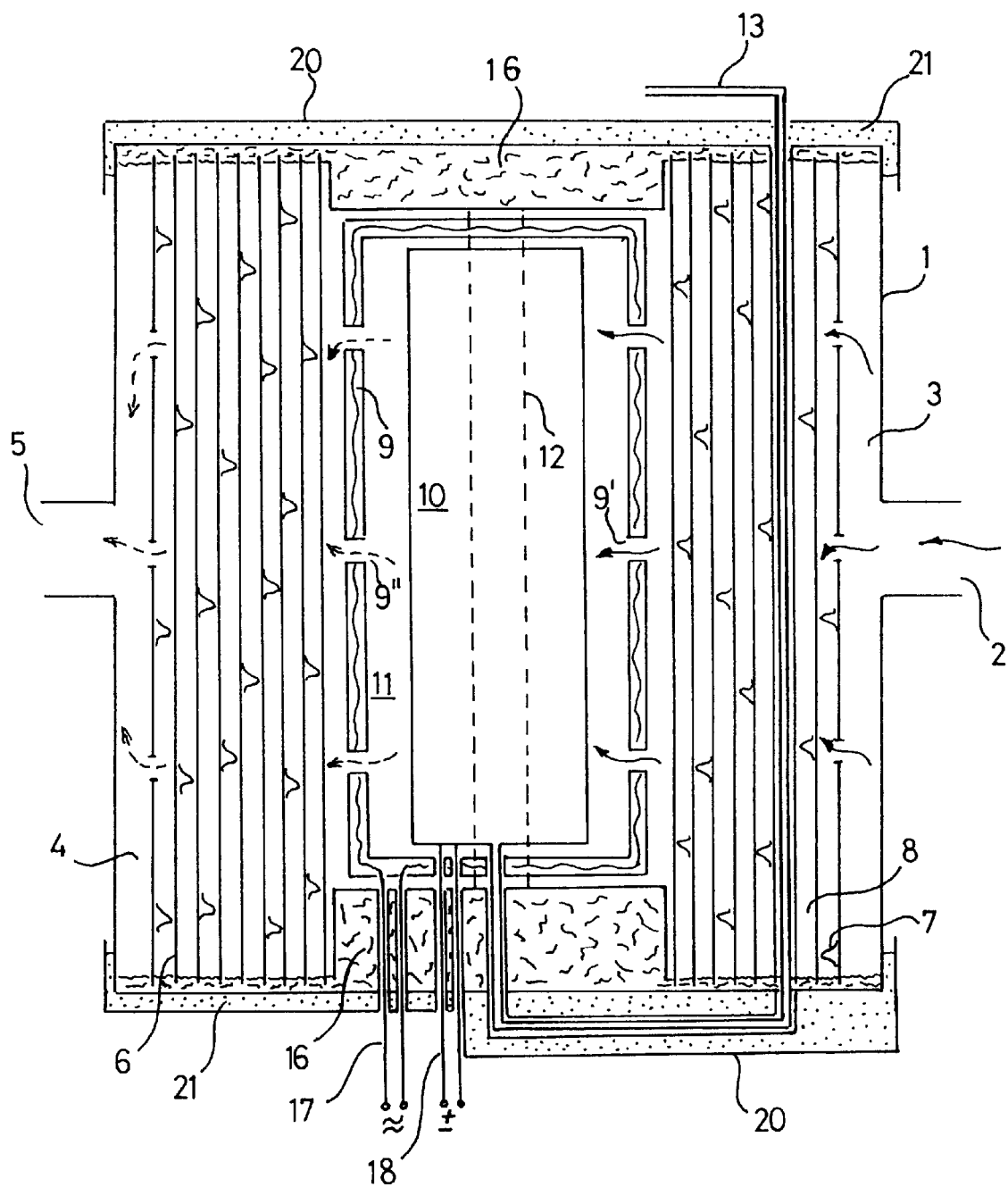
FIG. 3 shows a high temperature gas separation apparatus with integrated heat exchanger for the hot separated gas component.

In another embodiment, depicted in FIG. 3, the heat exchange between the hot gas, separated from the fresh gas, is accomplished by incorporation of the exit gas conduit 13 into the heat exchanger-insulation structure formed by the spirally wound metal sheets 6. The conduit 13 for the separated product gas is placed in a temperature region inward from the gas manifolds 3 and 4 in order to keep the temperature of the outside wall 1 cool.

Figure 4:
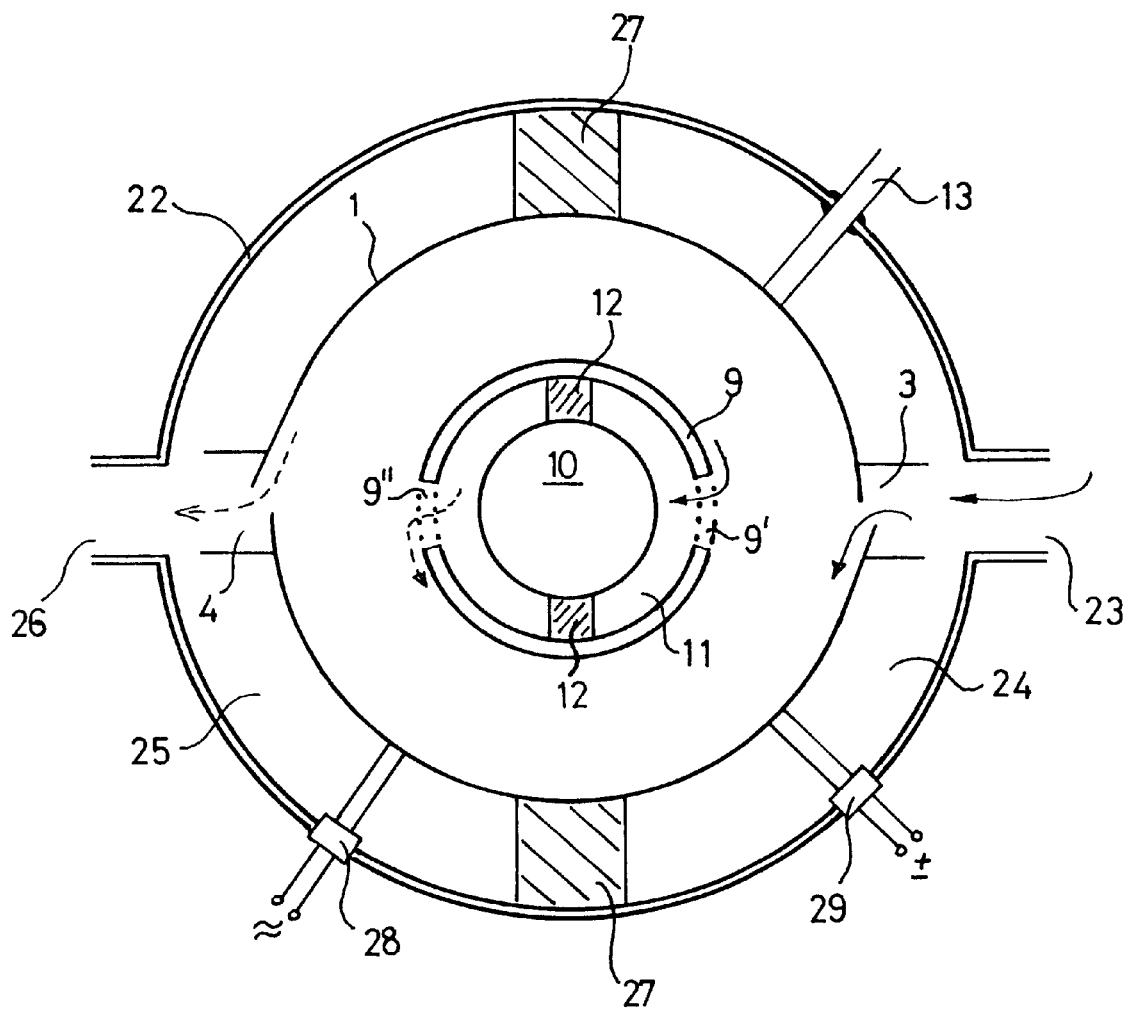
FIG. 4 shows a high temperature gas separation apparatus with pressure vessel.

FIG. 4 depicts, in a schematic transverse cross section, the arrangement of a high temperature gas separation apparatus, such as shown in FIGS. 1, 2, and 3, surrounded by an additional vessel 22 which serves to pressurize the active gas separation unit, as well as to keep the process oases separate from the environment external to vessel 22. The active gas separation unit 10 is pressurized in this application in order to establish a partial pressure gradient of the gas, being the subject of separation, across a hot material layer within the active gas separation unit, which is selectively permeable to such a gas, and where the partial pressure gradient causes the gas separation process. As an example, the material layer can be that of a mixed conducting, oxygen-ionic/electronic, perovskite for the separation of oxygen from air, where, for instance, the application of a fivefold ambient air pressure in the pressure vessel causes oxygen transfer through the heated perovskite layer and to emanate as pure oxygen gas on the other side of the layer at a pressure which is five times higher than the oxygen partial pressure in the ambient fresh air.

Special electrically insulating power line penetrations 28 and 29 for the heater structure 9 and for an optional power line for a direct current powered gas separation device, are fitted into the wall of the vessel 22. A vessel inlet port 23 allows gas flow into an entrance chamber 24 and through the manifold 3, into and through the active gas separation unit 10 and to the gas chamber 25 and finally through the exit port 26. External to the enclosed high temperature gas separation apparatus, yet inside vessel 22, flow barriers 27 are installed which prevent process gas flow from bypassing the gas separation apparatus, as surrounded by the vessel.

A DC-powered electrochemical oxygen separation apparatus can also be operated advantageously in a pressure vessel, because a higher oxygen concentration (pressure) at the cathode (negative electrode) can lead to a higher current density and reduced size of the active gas separation unit. This mode of operation is of particular interest in processes where pressurized air is an inexpensive commodity.

The choice of materials for the construction for the heat exchanger-insulation combination depends very much on the operational active gas separation unit temperature, for instance, of an electrochemical oxygen separator. Excessive metal oxidation would lead to the oxidative destruction of the heat exchange surfaces of the metal sheets 6 accompanied by deterioration of the insulation characteristics. Stainless steel of the 304 type or even mild steel is acceptable in the lower temperature region of the heat exchanger. Alloys of the Inconel 600 type are advantageously used at higher temperatures, approaching 700° C. For higher temperatures, up to 900° C., superior oxidation resistance to that of Inconel type or other superalloys is required.

In the last few years new alloys based on the iron aluminide and nickel aluminide systems have been developed and tested with respect to oxidation resistance. An iron/aluminum/chromium alloy with a content of 5.5% chromium and 15.9% aluminum and minor amounts of zirconium and boron shows excellent oxidation resistance even at 1000° C. in air and is useful in the application of this invention (K. Natesan et.al., Proc. 10th Annual Conf. On Fossil Energy Mat., 5,14–16, 1996, Knoxville, Tenn. DOE Conf. Abstr. pp. 273—280). Alloys of this or similar composition develop a tenaciously adhering dense aluminum oxide scale on the heat exchange surfaces made of such alloys which prevents further oxidative attack. Also, these alloys have potential for being less expensive in comparison with superalloys. The aluminide based alloys do not necessarily exhibit the mechanical strength at high temperatures which would be necessary for conventional welded heat exchangers, however, the alloys can be roll-milled to a thin thickness as required for sheets 6 in the apparatus according to this invention and shown in FIGS. 1, 2, and 3.

The description of the preferred embodiments as depicted in FIGS. 1, 2, 3, and 4 applies equally to high temperature gas separation devices for oxygen, hydrogen, and helium, as well as to other gas separation devices in processes where heat recovery and thermal insulation is of essence. The materials of construction, however, may need adaptation to physical and chemical requirements as demanded by each individual process. In general, less demand on oxidation resistance of the metal sheets 6 is expected for hydrogen separators and helium separators which would replace the oxygen separation unit 10 in the axial center cavity 11, because the active gas separation units of these devices operate at lower temperatures.

OPERATION

The functional principle of a high temperature gas separator, for example in the form of a high temperature electrochemical oxygen separator using solid electrolyte cells with electrodes, is best explained on the basis of the FIGS. 1 and 2.

Oxygen rich (fresh) air flows from inlet 2 partially through bypass 19 to a heat exchanger 14 in order to cool the separated hot oxygen which emanates from the active oxygen separation unit 10 through conduit 13. A major air flow passes through conduit 15, it combines with the air flow from heat exchanger 14 and the combined air streams enter the air manifold 3. From there the air flows through the spiral channel between metal sheet heat exchange surfaces 6 toward the center cavity 11 where the active electrochemical oxygen separation unit 10 is located. The oxygen rich air is forced by flow barriers 12 to flow over the active regions of the electrochemical oxygen separation unit 10, where oxygen is extracted and transported internally (not shown) to an outlet conduit 13. The oxygen-depleted air flows spirally outward between the heat exchange surfaces of the metal sheets 6 toward the spent air outlet 5.

The operational procedures are straight forward as follows. Heater 9 is activated to preheat the active oxygen separation unit 10 to or near its operating temperature between 500 and 900° C. Once the operational temperature has been reached, an air flow is initiated to flow toward the active oxygen separation unit 10. On its passage between the metal sheets air is preheated in counter flow fashion before oxygen separation takes place while the air is in intimate contact with said active oxygen separation unit members (not shown). The oxygen-depleted hot air flows from the hot center cavity 11 toward outlet 5 while in intimate heat exchange with the counter-flow of colder oxygen rich air toward the active oxygen separation unit 10.

What is claimed is:

1. A high temperature gas separation apparatus comprising a heat exchanger structure consisting of spirally wound metal sheets disposed in spaced relationship so as to define parallel spiral gas inlet and gas outlet flow passages separated by a sheet wall and forming in the center an axial center cavity, a high temperature active gas separation unit disposed in said center cavity, said inlet gas flow passage having an outer end with a gas inlet structure provided with a gas inlet opening for supplying fresh gas to said high temperature active gas separation unit in said center cavity, and said outlet gas flow passage having an inner end in communication with said high temperature active gas separation unit and an outer end with an outlet for conducting depleted gas from said high temperature active gas separation unit out of said apparatus in heat transfer relation with said fresh gas flowing inwardly through said inlet gas flow passage, a conduit extending from said high temperature active gas separation unit for removing gas separated from said fresh gas in said high temperature active gas separation unit, and means leading to said center cavity for heating said high temperature active gas separation unit.

2. A high temperature gas separation apparatus according to claim 1, wherein said active gas separation unit is disposed in said center cavity in spaced relationship from circumferential walls defining said center cavity, and circumferentially spaced barriers are disposed between said active gas separation unit and said circumferential wall to define a gas inlet manifold adjacent an inlet side of said active gas separation unit which is in communication with said inlet gas flow passage and a gas outlet manifold adjacent an outlet side of said active gas separation unit which is in communication with said outlet gas flow passage.

3. A high temperature gas separation apparatus according to claim 2, wherein said circumferential wall, defining said center cavity, consists of high temperature resistant materials.

4. A high temperature gas separation apparatus according to claim 3, wherein said high temperature resistant materials are ceramic materials.

5. A high temperature gas separation apparatus according to claim 3, wherein said high temperature resistant materials are metals.

6. A high temperature gas separation apparatus according to claim 1, wherein said active gas separation unit is an electrochemical oxygen generator.

7. A high temperature gas separation apparatus according to claim 6, wherein said active gas separation unit is made from electrochemical cells with stabilized zirconia solid electrolyte with attached electrodes connected to a direct current power source to provide for oxygen separation.

8. A high temperature gas separation apparatus according to claim 6, wherein said active gas separation unit is made from electrochemical cells with doped bismuth oxide solid electrolyte with attached electrodes connected to a direct current power source to provide for oxygen separation.

9. A high temperature gas separation apparatus according to claim 6, wherein said active gas separation unit is made from electrochemical cells with doped cerium oxide solid electrolyte with attached electrodes connected to a direct current power source to provide for oxygen separation.

10. A high temperature gas separation apparatus according to claim 1, wherein said high temperature gas separation apparatus is surrounded by a pressure vessel to cause gas separation within said active gas separation unit by establishing gas pressure gradients.

11. A high temperature gas separation apparatus according to claim 10 wherein said active gas separation unit is an active oxygen gas separation unit.

12. A high temperature gas separation apparatus according to claim 11, wherein said active oxygen gas separation unit is made from mixed conducting, oxygen-ionic/electronic, oxide layers which are permeable to oxygen ions, and where oxygen separation is accomplished by the application of an oxygen pressure gradient across said permeable layers to provide for oxygen separation.

13. A high temperature gas separation apparatus according to claim 12, wherein said mixed conducting oxide is at least one of the group comprising perovskites and electronically doped stabilized zirconia, ceria, and bismuth oxide.

14. A high temperature gas separation apparatus according to claim 13, wherein said perovskites are of the general formula $ABO_3$ wherein A consists of at least calcium, strontium, and elements of the group of lanthanides in the periodic table of elements, and the element yttrium, and wherein B consists of at least one of the elements of the group of chromium, manganese, iron, cobalt, nickel, aluminum, gallium, and indium.

15. A high temperature gas separation apparatus according to claim 10, wherein said active gas separation unit is a hydrogen separator.

16. A high temperature gas separation apparatus according to claim 15, wherein said active gas separation unit is based on palladium diffusion membranes.

17. A high temperature gas separation apparatus according to claim 15, wherein said active gas separation unit is based on molecular sieve membranes.

18. A high temperature gas separation apparatus according to claim 10, wherein said active gas separation unit is a helium separator.

19. A high temperature gas separation apparatus according to claim 18, wherein said active gas separation unit is based on molecular sieve membranes.

20. A high temperature gas separation apparatus according to claim 1, wherein said metal sheets consist of stainless steel.

21. A high temperature gas separation apparatus according to claim 1, wherein said metal sheets consist of iron aluminide based alloys.

22. A high temperature gas separation apparatus according to claim 1, wherein said metal sheets consist of nickel aluminide based alloys.

23. A high temperature gas separation apparatus according to claim 1, wherein each of said metal sheets comprise at least two longitudinal sections of different metal alloys.

24. A high temperature gas separation apparatus according to claim 1, wherein said conduit for removing said gas separated from said fresh gas extends from said high temperature active gas separation unit through said spirally wound metal sheets to cool said gas separated from said fresh gas.

25. A high temperature gas separation apparatus according to claim 1, wherein said conduit for removing said gas separated from said fresh gas extending from said high temperature active gas separation unit is incorporated in a separate heat exchanger to cool said gas separated from said fresh gas.

26. A high temperature gas separation apparatus according to claim 1, wherein the spaces between the edges of said spirally wound metal sheets are filled with a sealant to form flat end walls at the ends of said spirally wound metal sheets.

27. A high temperature gas separation apparatus according to claim 26, wherein said flat end walls are covered with thermally insulated metal end caps.

28. A high temperature gas separation apparatus according to claim 1, wherein ceramic material is disposed at the ends of said center cavity for sealing and thermal insulation.

* * * * *